United States Patent
Ross

(10) Patent No.: US 12,320,504 B2
(45) Date of Patent: *Jun. 3, 2025

(54) HEAD-MOUNTED ILLUMINATION DEVICES

(71) Applicant: Hourglass Medical LLC, Monticello, IL (US)

(72) Inventor: Jeremy B. Ross, Monticello, IL (US)

(73) Assignee: Hourglass Medical LLC, Monticello, IL (US)

( * ) Notice: Subject to any disclaimer, the term of this patent is extended or adjusted under 35 U.S.C. 154(b) by 52 days.

This patent is subject to a terminal disclaimer.

(21) Appl. No.: 18/320,681

(22) Filed: May 19, 2023

(65) Prior Publication Data
US 2023/0288047 A1    Sep. 14, 2023

Related U.S. Application Data

(63) Continuation of application No. 17/664,530, filed on May 23, 2022, now Pat. No. 11,692,693, which is a
(Continued)

(51) Int. Cl.
*F21V 21/084*    (2006.01)
*F21V 21/08*    (2006.01)
(Continued)

(52) U.S. Cl.
CPC ........ *F21V 21/084* (2013.01); *F21V 23/0435* (2013.01); *F21V 33/0056* (2013.01);
(Continued)

(58) Field of Classification Search
CPC ............... F21V 21/084; F21V 21/0816; F21V 21/0435; F21V 33/0056; A42B 1/244;
(Continued)

(56) References Cited

U.S. PATENT DOCUMENTS 4,920,466 A    4/1990 Liu
4,970,589 A    11/1990 Hanson et al.
(Continued)

FOREIGN PATENT DOCUMENTS

CN        208338996 U    1/2019
DE    10 2006 015334 A1    10/2007
(Continued)

OTHER PUBLICATIONS

Rosenberg; et al., "Smart helmet: Monitoring brain, cardiac and respiratory activity," 2015 37th Annual U_ l International Conference of the IEEE Engineering in Medicine and Biology Society (EMBC), Milan, 2015, pp. 1829-1832, NPLOO1 (Year: 2015).*
(Continued)

*Primary Examiner* — William N Harris
*Assistant Examiner* — James M Endo
(74) *Attorney, Agent, or Firm* — Ascenda Law Group, PC

(57) ABSTRACT

Illumination devices as include a frame intended to be worn by a user and one or more light sources (e.g., LEDs) positioned by the frame so as to be near a user's zygomatic bones and oriented to project light in a direction of the user's view when the illumination device is worn on the wearer's head. The frame may be shaped to be worn over the user's ears and behind the user's head, and may be made of one or more of plastic, metal and/or a metal alloy, carbon fiber, wood, cellulose acetate, natural horn and/or bone, leather, and an epoxy resin. An optional strap may be retractably attached to connect portions of the frame over the wearer's head. The LEDs may be included in respective panels swively mounted to booms of the frame and the panels may further include imaging devices, such as a camera, and/or a projector.

13 Claims, 7 Drawing Sheets

Related U.S. Application Data continuation of application No. 17/301,595, filed on Apr. 8, 2021, now Pat. No. 11,339,953, which is a continuation of application No. 16/202,601, filed on Nov. 28, 2018, now Pat. No. 11,002,437.

(60) Provisional application No. 62/729,048, filed on Sep. 10, 2018, provisional application No. 62/596,046, filed on Dec. 7, 2017.

(51) Int. Cl.
*F21V 23/04* (2006.01)
*F21V 33/00* (2006.01)
*F21Y 115/10* (2016.01)
*G02B 27/01* (2006.01)

(52) U.S. Cl.
CPC ....... *F21V 21/0816* (2013.01); *F21Y 2115/10* (2016.08); *G02B 27/0176* (2013.01)

(58) Field of Classification Search
CPC ..... A42B 3/044; A42B 3/0446; A42B 3/0433; A42B 3/322; A42B 3/042; A42B 3/324; G02B 27/017; G02B 27/0172; G02B 27/0176; G02B 2027/0161; G02B 2027/0178; G02B 2027/015; G02B 2027/0152; G02B 2027/0154; G02B 2027/0156; G02B 2027/0138; G02B 2027/014; G02B 2027/0141; G02C 11/04
See application file for complete search history.

(56) References Cited

U.S. PATENT DOCUMENTS

| | | | |
|---|---|---|---|
| 5,003,973 A | 4/1991 | Ford et al. | |
| 5,083,246 A | 1/1992 | Lambert | |
| 5,946,071 A | 8/1999 | Feldman | |
| 5,951,141 A * | 9/1999 | Bradley | F21V 21/084 362/253 |
| 6,016,160 A | 1/2000 | Coombs et al. | |
| 6,046,712 A | 4/2000 | Beller et al. | |
| 6,126,294 A | 10/2000 | Koyama et al. | |
| 6,301,050 B1 | 10/2001 | DeLeon | |
| 6,560,029 B1 * | 5/2003 | Dobbie | G02B 23/125 2/6.1 |
| 6,580,448 B1 | 6/2003 | Stuttler | |
| 6,612,695 B2 | 9/2003 | Waters | |
| 6,619,813 B1 | 9/2003 | Schnell | |
| 6,896,389 B1 | 5/2005 | Paul | |
| 7,155,025 B1 * | 12/2006 | Weffer | H04R 5/033 381/384 |
| 7,370,991 B1 | 5/2008 | Ellis-Fant | |
| 7,422,324 B2 * | 9/2008 | Lee | G02C 11/04 351/158 |
| 7,814,903 B2 | 10/2010 | Osborne et al. | |
| 8,188,937 B1 | 5/2012 | Amafuji et al. | |
| 8,235,524 B2 | 8/2012 | Waters | |
| 8,371,707 B2 | 2/2013 | Uzar | |
| 8,545,041 B2 * | 10/2013 | Brown | F21V 21/0885 24/336 |
| 8,714,769 B2 | 5/2014 | Cristoforo | |
| 10,496,788 B2 | 12/2019 | Amarasingham et al. | |
| 10,539,787 B2 | 1/2020 | Haddick et al. | |
| 11,002,437 B2 * | 5/2021 | Ross | F21V 23/0435 |
| 11,339,953 B2 * | 5/2022 | Ross | F21V 23/0435 |
| 11,692,693 B2 * | 7/2023 | Ross | F21V 33/0056 362/105 |
| 2002/0027777 A1 | 3/2002 | Takasu | |
| 2002/0122014 A1 | 9/2002 | Rajasingham | |
| 2003/0202341 A1 | 10/2003 | McClanahan | |
| 2004/0008158 A1 | 1/2004 | Chi et al. | |
| 2004/0136178 A1 | 7/2004 | Yu | |
| 2004/0189930 A1 | 9/2004 | Skuro | |
| 2004/0252487 A1 | 12/2004 | McCullough et al. | |
| 2005/0226433 A1 | 10/2005 | McClanahan | |
| 2006/0048286 A1 | 3/2006 | Donato | |
| 2006/0119539 A1 | 6/2006 | Kato et al. | |
| 2006/0238878 A1 | 10/2006 | Miyake et al. | |
| 2007/0159810 A1 * | 7/2007 | Kim | F21V 21/08 362/105 |
| 2007/0277819 A1 | 12/2007 | Osborne et al. | |
| 2008/0158506 A1 * | 7/2008 | Fuziak | G02C 5/146 351/158 |
| 2009/0073082 A1 | 3/2009 | Yoshikawa | |
| 2009/0174946 A1 | 7/2009 | Raviv et al. | |
| 2009/0251661 A1 * | 10/2009 | Fuziak, Jr. | G02C 5/001 351/158 |
| 2009/0275808 A1 | 11/2009 | Dimaio et al. | |
| 2010/0014699 A1 | 1/2010 | Anderson et al. | |
| 2010/0081895 A1 | 4/2010 | Zand | |
| 2010/0327028 A1 * | 12/2010 | Nakabayashi | G02B 27/0176 224/181 |
| 2011/0089207 A1 | 4/2011 | Tricoukes et al. | |
| 2011/0145978 A1 | 6/2011 | Harbin | |
| 2011/0252546 A1 | 10/2011 | Junker et al. | |
| 2011/0288445 A1 | 11/2011 | Lillydahl et al. | |
| 2011/0317402 A1 | 12/2011 | Cristoforo | |
| 2012/0002046 A1 | 1/2012 | Rapoport et al. | |
| 2012/0206323 A1 | 8/2012 | Osterhout et al. | |
| 2012/0229248 A1 | 9/2012 | Parshionikar et al. | |
| 2012/0287284 A1 * | 11/2012 | Jacobsen | G05D 1/224 345/419 |
| 2013/0300649 A1 | 11/2013 | Parkinson et al. | |
| 2014/0000014 A1 | 1/2014 | Redpath et al. | |
| 2014/0079257 A1 | 3/2014 | Ruwe et al. | |
| 2014/0125789 A1 | 5/2014 | Bond et al. | |
| 2014/0160250 A1 | 6/2014 | Pomerantz et al. | |
| 2014/0259287 A1 | 9/2014 | Waters et al. | |
| 2014/0354397 A1 | 12/2014 | Quintal, Jr. et al. | |
| 2015/0109769 A1 | 4/2015 | Chang | |
| 2016/0054570 A1 * | 2/2016 | Bosveld | A41D 20/00 2/209.3 |
| 2016/0085092 A1 | 3/2016 | Calilung et al. | |
| 2016/0178903 A1 | 6/2016 | Nakajima | |
| 2016/0178912 A1 * | 6/2016 | Kusuda | G02B 27/0172 359/630 |
| 2016/0216519 A1 | 7/2016 | Park et al. | |
| 2016/0255305 A1 | 9/2016 | Ritchey et al. | |
| 2016/0316181 A1 | 10/2016 | Hamra | |
| 2017/0075198 A1 | 3/2017 | Kuroki | |
| 2017/0215717 A1 | 8/2017 | Orringer et al. | |
| 2017/0227780 A1 | 8/2017 | Tatsuta et al. | |
| 2019/0178476 A1 | 6/2019 | Ross | |
| 2019/0178477 A1 | 6/2019 | Ross | |
| 2019/0265802 A1 | 8/2019 | Parshionikar | |

FOREIGN PATENT DOCUMENTS

| | | | | |
|---|---|---|---|---|
| FR | 2832906 A1 | 6/2003 | | |
| WO | 96/37730 A1 | 11/1996 | | |
| WO | 2010/062479 A1 | 6/2010 | | |
| WO | WO-2015124937 A1 * | 8/2015 | ........... | A42B 3/0433 |

OTHER PUBLICATIONS

Etani, Takehito, "The Masticator", The Masticator: the social mastication (2016), downloaded from: http://www.takehitoetani.com/masticator, 5 pages.

International Preliminary Report on Patentability mailed Aug. 4, 2020, from the IPEA/US, for International Application No. PCT/US2018/062767 (filed Nov. 28, 2018), 18 pgs.

International Search Report and Written Opinion mailed Mar. 5, 2019, from the ISA/US, for International Application No. PCT/US18/62767 (filed Nov. 28, 2018), 15 pages.

Invitation to Pay Additional Fees and Partial Search mailed Mar. 4, 2020, from the ISA/European Patent Office, for International Patent Application No. PCT/US2019/063717 (filed Nov. 27, 2019), 15 pages.

Goel, Mayank; et al., "Tongue-in-Cheek: Using Wireless Signals to Enable Non-Intrusive and Flexible Facial Gestures Detection",

(56) References Cited

OTHER PUBLICATIONS

HMDs & WEarables to Overcome Disabilities, CHI 2015, Apr. 18-23, 2015, Crossings, Seoul, Korea, pp. 255-258.

Von Rosenberg; et al., "Smart helmet: Monitoring brain, cardiac and respiratory activity," 2015 37th Annual International Conference of the IEEE Engineering in Medicine and Biology Society (EM BC), Milan, 2015, pp. 1829-1832, NPL001 (Year: 2015).

Xu; et al., "Clench Interaction: Novel Biting Input Techniques", Human Factors in Computing Systems Proceedings (CHI 2019), May 4-9, 2019, 12 pages.

International Search Report and Written Opinion mailed Oct. 20, 2021, from the ISA/European Patent Office, for International Application No. PCT/US2021/039395 (filed Jun. 28, 2021), 14 pgs.

\* cited by examiner

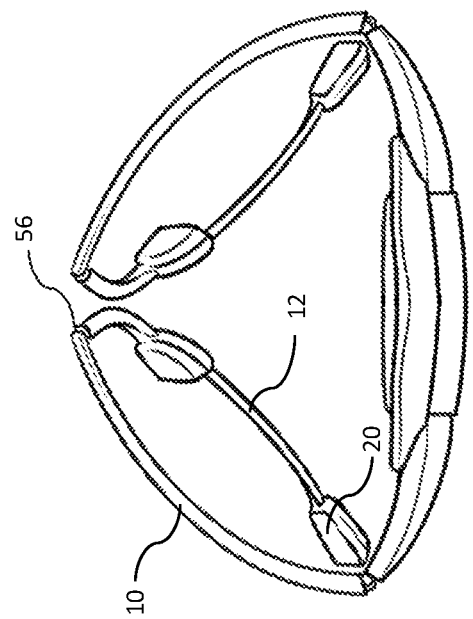
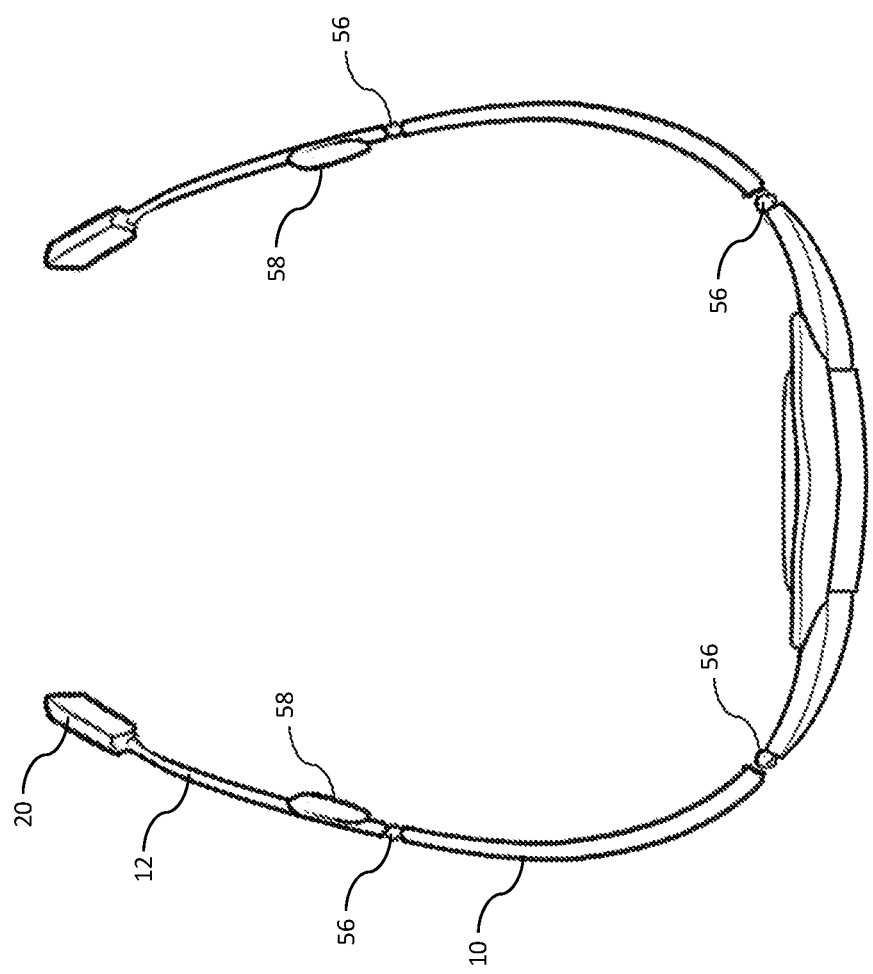

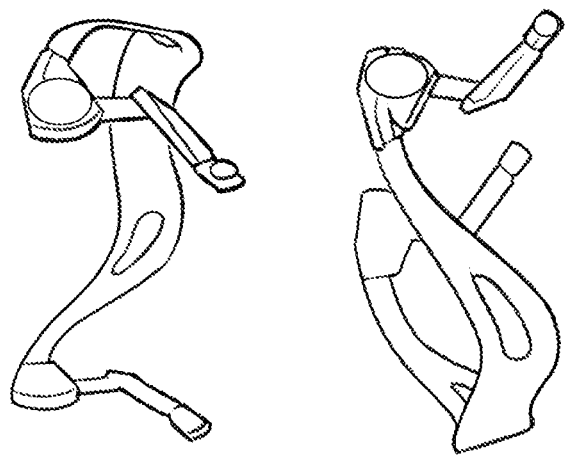
FIG. 4

HEAD-MOUNTED ILLUMINATION DEVICES

RELATED APPLICATIONS

This is a CONTINUATION of U.S. application Ser. No. 17/664,530, filed May 23, 2022, which is a CONTINUATION of U.S. application Ser. No. 17/301,595, filed Apr. 8, 2021, now U.S. Pat. No. 11,339,953, which is a CONTINUATION of U.S. application Ser. No. 16/202,601, filed Nov. 28, 2018, now U.S. Pat. No. 11,002,437, which is a NON-PROVISIONAL and claims the priority benefit of U.S. Provisional Application Nos. 62/596,046, filed Dec. 7, 2017, and 62/729,048, filed Sep. 10, 2018, each of which is incorporated herein by reference.

FIELD OF THE INVENTION

The present invention relates generally to illumination devices and, more particularly, to such illumination devices as are mounted on a frame intended to be worn on the person of a user, for example, on the user's head.

BACKGROUND

Head-worn illumination devices find application in a variety of fields and activities. Typically, such devices are worn atop a wearer's head, e.g., secured by or to a strap, cradle, or helmet, etc., or may be positioned on or in spectacle frames, e.g., near the wearer's temples. The benefit of head-worn illumination devices is that they leave the wearer's hands free to perform tasks other than holding the illumination device.

SUMMARY OF THE INVENTION

Various embodiments of a head-worn illumination devices are described herein. In one or more of those embodiments, an illumination device includes a frame having one or more booms configured to position one or more light sources (e.g., light emitting diodes (LEDs)) of the illumination device near a wearer's zygomatic bones when the illumination device is worn on the wearer's head, said light sources oriented to project light in a direction of the wearer's view. The frame is preferably shaped to be worn over the wearer's ears and behind the wearer's head, and is made of one or more of plastic, metal and/or a metal alloy, carbon fiber, wood, cellulose acetate, natural horn and/or bone, leather, and an epoxy resin. An optional strap may be retractably attached to connect the booms over the wearer's head.

The LEDs are included in respective panels swivelly mounted to the booms and may emit light in the visible or other spectrum. One or more of the panels may further include an imaging device, for example, a camera, and/or a projector oriented to project an image towards the wearer's eye and/or towards an area the user is staring.

In some instances, the light sources may comprise fiber optic cables, which act as waveguides to optically convey light from an illumination source. That source may be local to or remote from the frame.

The frame of the illumination device may be articulated at one or more hinge points. For example, the frame may be articulated at hinge points on each of the booms. This allows the frame to be comfortably fitted on the wearer's head and/or folded up. The frame may also include one or more grip points along its inner surface, which grip points are fitted with pads for contacting the wearer's skin.

The illumination device may also include audio communications means, e.g., a microphone and/or an earpiece, or bone conduction transducers for transmission and/or reception of audio signals, and may sometimes include a sensor package for monitoring of the wearer's vital statistics. The sensor package may include one or more sensor pads communicably coupled to a processor configured to sample signals from the sensor pads periodically and may also include a telemetry transmitter and an associated antenna.

These and further embodiments of the present invention are discussed in more detail below.

BRIEF DESCRIPTION OF THE DRAWINGS

The present invention is illustrated by way of example, and not limitation, in the figures of the accompanying drawings, in which:

FIGS. 3A and 3B illustrate aspects of the hinged articulation of a head-mounted illumination device configured in accordance with an embodiment of the present invention that allow the head-mounted illumination device to be folded when not in use.

FIG. 4 is a rendering that shows front and back perspective views of a head-mounted illumination device configured in accordance with an embodiment of the present invention, as well as a side profile of such an illumination device as worn by a user.

DESCRIPTION

Figure 1B:
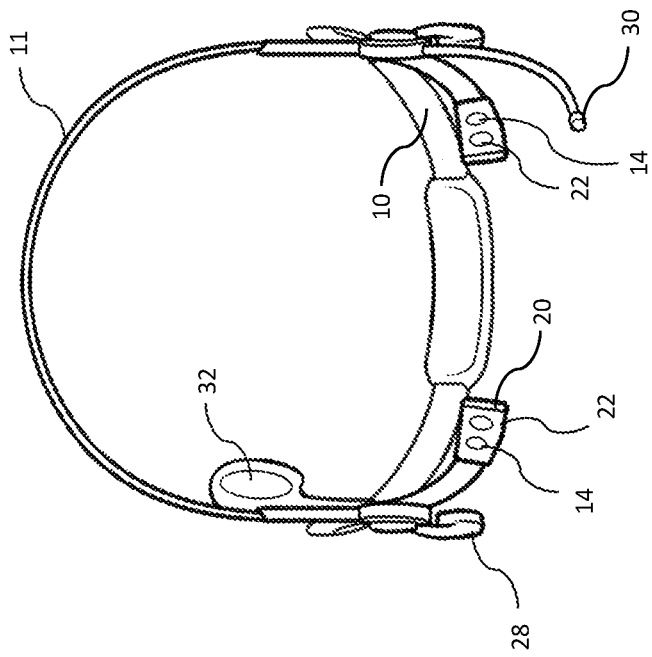
FIG. 1B is a front view of the head-mounted illumination device shown in FIG. 1A.
Figure 1A:
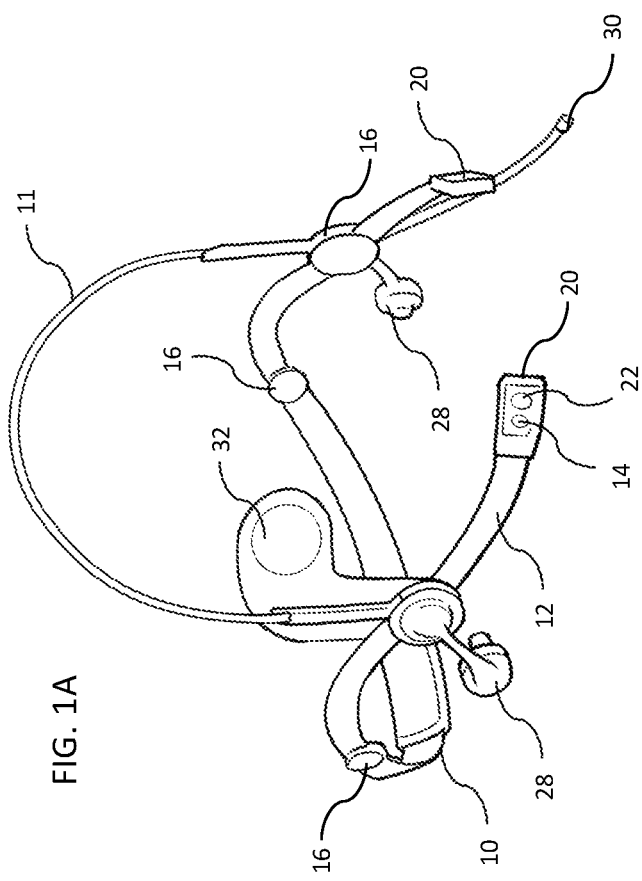
FIG. 1A is an isometric view of a head-mounted illumination device configured in accordance with an embodiment of the present invention.
Figure 1D:
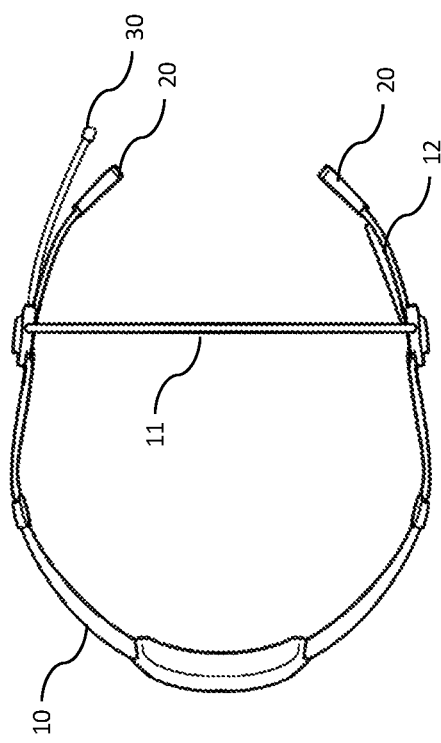
FIG. 1D is a top view of the head-mounted illumination device shown in FIG. 1A.
Figure 1C:
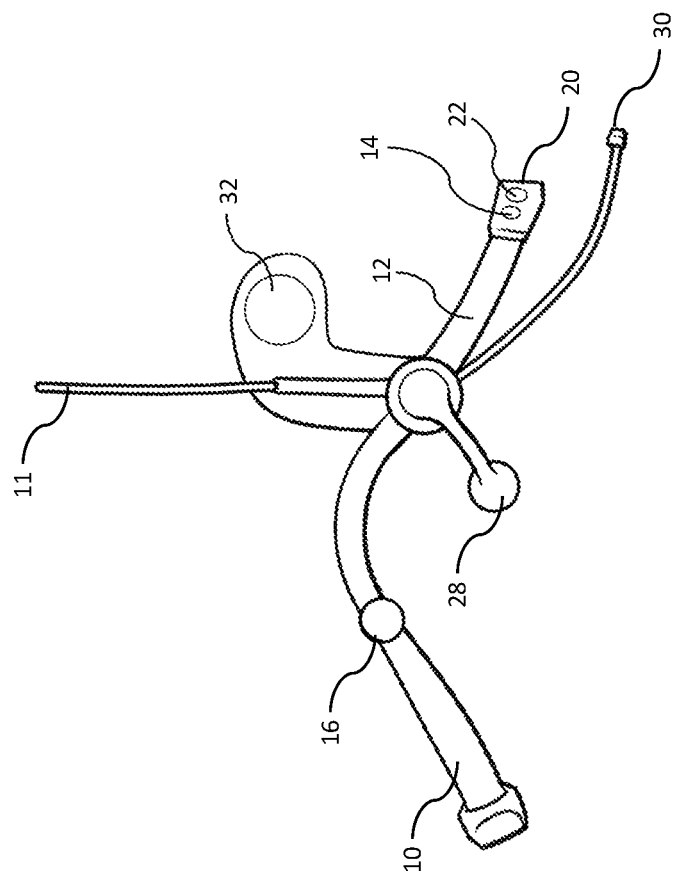
FIG. 1C is a partial side view of the head-mounted illumination device shown in FIG. 1A.

Described herein are illumination devices mounted on or in a frame intended to be worn on the person of a user, for example, on the user's head. Head-mounted illumination devices configured in accordance with embodiments of the present invention are suitable for application in a variety of contexts, including military, law enforcement, health care, and others (e.g., consumer). Unlike helmet-mounted lights, which require the user to wear a helmet in order to use them, illumination devices configured in accordance with embodiments of the present invention can be worn with or without a helmet or other eyewear, communication devices, visioning systems, etc. In particular, illumination devices configured in accordance with embodiments of the present invention provide directional lighting from the area of the user's zygomatic bones. Placing the light source in this vicinity reduces light-blinding of others when communicating. Additionally, the use of two (left-side and right-side), independently adjustable light sources allows for illumination of two areas simultaneously, at two separate color wavelengths if desired.

Illumination devices configured in accordance with embodiments of the present invention provide a relatively small (in terms of area being occupied), augmentative, illumination source that does not interfere with eye protection, loupes, masks, etc. Such illumination devices allow users to avoid shadowing that occurs within cavities when using ceiling-mounted or other overhead light sources.

In addition to lighting, the frame carrying the present illumination devices provides a platform for image and/or video capture and/or projection devices, for example as may be used with a helmet-worn or other heads-up display. Further, one or more microphones may be provided integral to or on the frame and/or on a boom associated with the frame that supports the illumination units. Hands-free operation of the present illumination devices may be facilitated using a boom microphone, an integral microphone, a chin-worn actuator that can be pressed against the wearer's shoulder, or a remote switch that can be activated (e.g., by voice command or otherwise) when worn under garments, for example as a pendant worn around the neck.

FIGS. 1A-1D and 2A-2C illustrate embodiments of a head-mounted illumination device configured in accordance with the present invention. As shown, individual illumination elements, e.g., light emitting diodes (LEDs) 14, are included on or in a harness 10, which is worn over the ears and behind the head, and which may include an optional retracting head strap 11 connecting the two sides of the harness. At the front of the harness are located one or more booms 12 that extend over a portion of the wearer's face, below the eyes, and terminate in the area of the zygomatic bones. Two such booms, one each on the left side and right side of the wearer's face are shown in the illustrations, however, embodiments of the invention may provide just a single such boom on one side of the wearer's face, or multiple such booms on each side of the wearer's face. For some specialized applications it may be desirable to have different numbers of booms on each side of a wearer's face. The booms may or may not contact the wearer's face and may include a rubberized or other backing to provide a comfortable surface against the wearer's cheek.

Each of the booms 12 terminates with a hinged panel 20. The hinged panels are swivelly mounted to the booms, e.g., with a piano hinge, butt hinge, barrel hinge, butterfly hinge, pivot hinge, spring hinge, or other arrangement, and may be detachable from the boom so as to be replaceable/reconfigurable. For example, different arrangements of hinged panels 20 may be adapted to carry different illumination devices, sensors, imaging devices, and/or projection devices. In some examples, hinged panels 20 may be adapted for carrying LEDs that emit light in the visible spectrum. Other forms of hinged panels 20 may be adapted to carry LEDs that emit light in other wavelengths, in addition to or in lieu of the LEDs that emit light in the visible spectrum. Still further forms of hinged panels 20 may be adapted to carry light detectors and/or imaging devices (e.g., still image and/or video cameras), in addition to or in lieu of the LEDs that emit light in the visible spectrum. Also, as discussed below, some hinged panels 20 may be adapted to carry LEDs that emit light as well as image/video projectors for use with a heads-up display or other imaging system. Although the majority of the remaining discussion focuses on hinged panels adapted to carry LEDs that emit light in the visible spectrum, this discussion applies equally to the other forms of hinged panels and associated illumination, projection, and imaging devices described herein. Cabling for the illumination devices and other sensors, etc. may be provided by wiring run through hollow channels within the hinged panels, booms and harness (not shown). In instances where the hinged panels 20 are detachable from the booms 12, electrical contacts may be placed on both sides of the hinged panel-boom junction so as to provide electrical continuity and avoid the need for separately coupled wirings (although such wired connections may be used).

In some instances, the illumination may be provided by fiber optic cables terminating (e.g., with or without lens systems) at the hinged panels, in which case the illumination source may be positioned remotely from the hinged panel, for example worn elsewhere on the person of the user such as in a shoulder harness or utility belt. This would allow for larger power sources and illumination sources of significant luminance, while still providing the directional control afforded by the use of the harness and boom system of the present invention. Likewise, image capture components, such as imaging systems and storage devices could be worn on a shoulder harness or belt and the information obtained by image sensors positioned in the hinged panels 20 at the ends of booms 12 conveyed to such systems through the use of fiber optic waveguides routed through channels in the present headwear.

The illustrated example of the hinged panels 20 at the ends of booms 12 are sized so as to provide one or more LEDs (and/or other sensors and/or projecting elements) approximately below the wearer's eye(s) and facing forward, in the direction the wearer is looking, so that the LEDs illuminate the area of interest to the wearer. The booms 12 are sized so as to position the hinged panels 20 so that they just rest on the wearer's cheeks, preferably over the zygomatic bones, without putting undue pressure thereon. Accordingly, harnesses 10 may be provided in various sizes to accommodate head sizes and shapes of different wearers, or they may be adjustable at one or more points to accomplish same. In some instances, harnesses and booms may be personalized to a wearer by creating a model, either physical or digital, of the wearer's head and face and fabricating a harness specifically to suit the wearer according to the dimensions provided from the model. Modern additive manufacturing processes (commonly known as 3D printing) make such customizations economically feasible even for consumer applications and custom harnesses could readily be produced from images of a wearer's head and face captured using computer-based cameras and transmitted to remote server hosting a Web service for purchase of the harness and accessories therefor. For example, following instructions provided by the Web-based service, a user may capture multiple still images and/or a short video of his/her head and face. By including an object of known dimensions (e.g., a ruler, a credit card, etc.) within the field of view of the camera at the approximate position of the user's head as the images are captured, a 3D model of the user's head and face can be created at the server. The user can then be provided with an opportunity to customize a harness to be sized to the dimensions of the model, selecting, for example, the number of booms, the type and number of hinged panels, with illumination or other accessories, the positions over the ears, etc. at which the harness will be worn, and other parameters of the to-be-manufactured harness. Once the customizations are specified, and payment collected, the harness specification may be dispatched to a manufacturing facility at which the harness is fabricated.

Figure 2A:
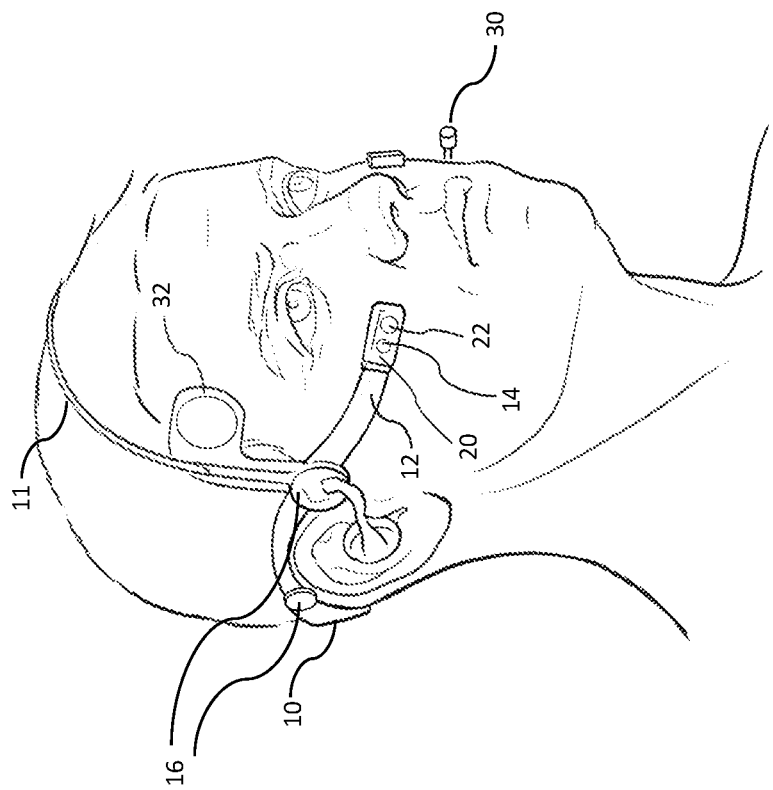
FIGS. 2A-2C illustrate aspects of a head-mounted illumination device configured in accordance with an embodiment of the present invention as worn by a user.
Figure 2B:
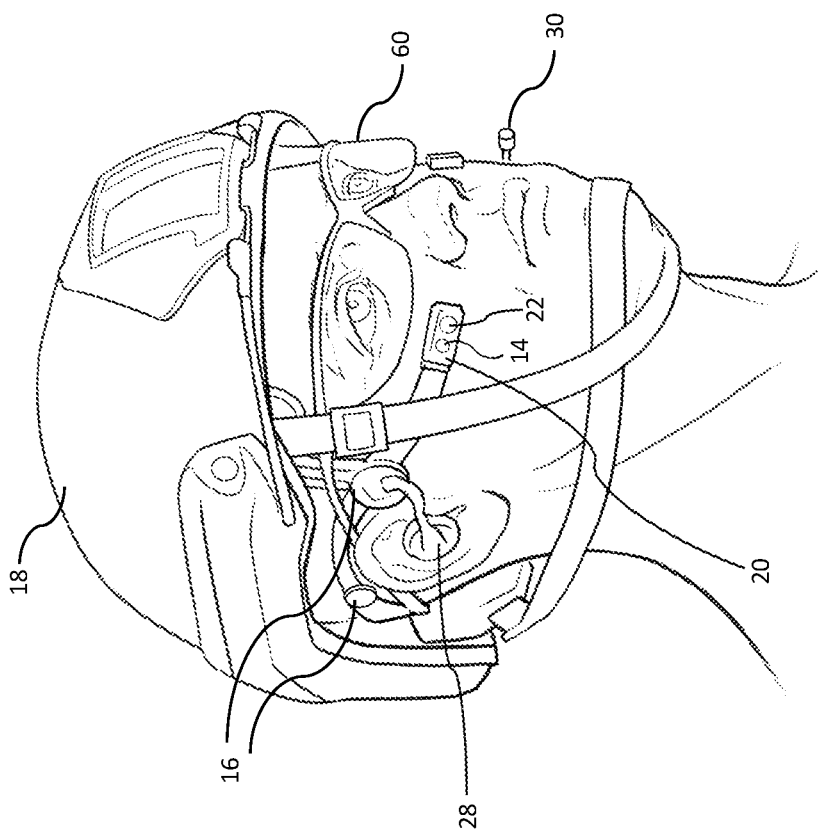

The harness 10 may include one or more hinge points 16, one or more on each side, about which sections of the harness may articulate so as to allow for a comfortable fit on the wearer. This may be especially important in harnesses that are not fabricated for personalized fit, so as to allow individual wearers to achieve a comfortable fit. As shown in FIG. 2A, the harness 10 may be worn next to the head, beneath a helmet 18. Accordingly, by allowing the harness 16 to articulate in several places, the fit of the harness may be adjusted to accommodate the presence of the helmet and its associated retention straps, as well as other helmet-worn accessories such as a screen 24 of a head-up display (see FIG. 2C).

The hinge points 16 may be purely friction fit adjustments in which the relative friction between opposing cylindrical ribs is sufficient to keep the relative orientation of two hinged members constant during wear. Or, the hinge points may incorporate ratchet fittings that provide interlocking gear-like rings to assure that the relative positions of two members will not change with respect to one another unless a relatively significant force is applied. Other hinged arrangements may be used at points 16, such as swivel torque hinges, circle rotational hinges, click and pawl mechanisms, etc. In some cases, the hinge points 16 are fitted with O-rings to prevent moisture from intruding.

Referring briefly to FIGS. 3A and 3B, in some embodiments additional hinge points 56 may be provided along booms 12 to allow the harness 10 to be folded into the configuration shown in FIG. 3B, with the booms folded inwards towards the rear of the harness. This allows easy storage of the harness while preventing accidental damage to the booms. As shown in FIG. 3A, one or more hinge points 56 may be included along the length of each boom, providing multiple points of articulation. The hinges used at hinge points 56 may be any of piano hinges, butt hinges, barrel hinges, spring hinges, or other arrangements.

Additionally, one or more grip points 58 along the inner surface of each boom 12 or other parts of harness 10 may be fitted with silicone pads for contacting the wearer's skin. The pads assist in reducing slipping of the harness when worn, and also distribute pressure over a larger surface area than might otherwise be the case if they were not present. While silicone pads are preferred, pads made of other materials, e.g., cork, may be used.

Figure 2C:
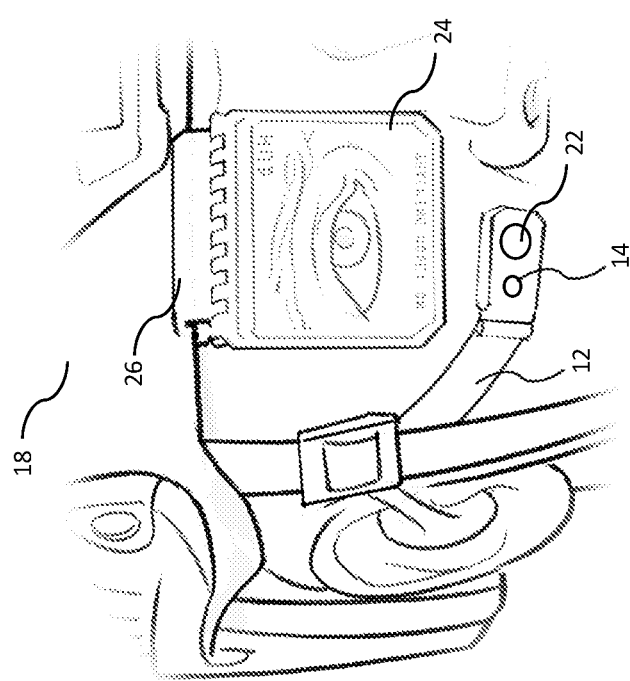

Referring back to FIGS. 1A-1D and 2A-2C, one or more LEDs 14 may be included in each hinged panel 20 at the end of each boom 12. In addition to the LED(s), the hinged panels 20 may include heads up display (HUD) projection optics 22. As shown in FIG. 2C, the HUD projection optics 22, which are oriented towards the wearer's eye, may be used to project information on a HUD screen 24 disposed in front of the wearer's eye(s). The screen 24 may be secured to helmet 18 on a hinge 26 so that it can be swiveled out of the wearer's line of sight when not in use, or it may exist in the form of a screen 60 worn in front of the wearer's eyes in a fashion similar to a pair of spectacles (see FIG. 2A). Alternatively, the projector may be oriented away from the user so that images can be projected onto a surface in front of the user. A power source and telemetry transmitter (e.g., for HUD data and audio communications) may be included in the harness 10 and/or a helmet 18 and attached to the various illumination and video elements, microphone(s), and earpiece(s) via one or more wire leads within the harness.

Figure 5:
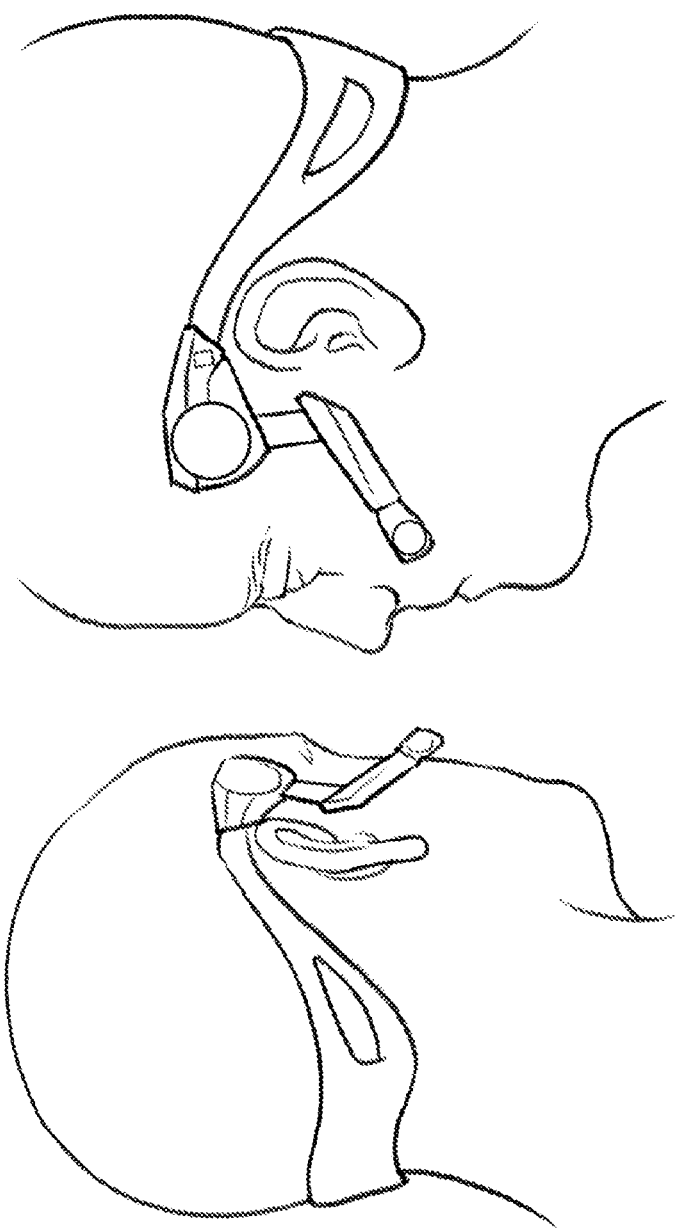
FIG. 5 illustrates additional rear-side profile views of an illumination device such as that shown in FIG. 4 as worn by a user.

FIG. 4 is a rendering that shows front and back perspective views of a head-mounted illumination device configured in accordance with an embodiment of the present invention, as well as a side profile of such an illumination device as worn by a user. FIG. 5 illustrates additional rear-side profile views of such an illumination device as worn by a user.

Returning to FIGS. 1A-1D, the harness 10 may further support one or more communication earpieces 28. Together with one or more boom microphones 30, which may be supported on one or more booms separate from that used to carry hinged panels 20 (or, in some embodiments, on the same boom), the earpiece and microphone allow for communications to/from the wearer. The earpiece and microphone may be communicatively connected to a transceiver carried elsewhere on the wearer's person, either using wired or wireless connections.

In other embodiments, the earpiece 28 and/or microphone 30 may be eliminated, and audio communications facilitated through bone conduction elements. Portions of the harness 10 are in contact with the wearer's head. Hence, rather than an earpiece, a bone conduction headphone that decodes signals from a receiver and converts them to vibrations can transmit those vibrations directly to the wearer's cochlea. The receiver and bone conduction headphone(s) may be embedded directly in the harness 10, or in some cases the receiver may be external to the harness. One or more bone conduction headphones may be provided. For example, the headphone(s) may be similar to bone conduction speakers employed by scuba divers and may consist of a piezoelectric flexing disc encased in a molded portion of the harness 10 that contacts the wearer's head just behind one or both ears. Similarly, a bone conduction microphone may be provided in lieu of a boom microphone.

In some embodiments, harness 10 may include a sensor package 32 that allows for monitoring of the wearer's vital statistics. A power source and telemetry transmitter (not shown) may be included in harness 10 and attached to the sensor package via one or more wire leads. Thus, even with a helmet removed, the sensor package 32 can continue to relay information concerning the wearer's vital statistics and other monitored biometrics via the telemetry transmitter, because harness 10 remains attached to the wearer.

The sensor package may include a sensor pad constructed of conductive fabric that contact the wearer at or near the temple. Additional sensor pads may be integrated in the harness 10 or may be included in the retractable strap positioned over the head of the wearer. This would allow for additional sensor readings for electrophysiological or other noninvasive monitoring of the wearer.

Figure 6:
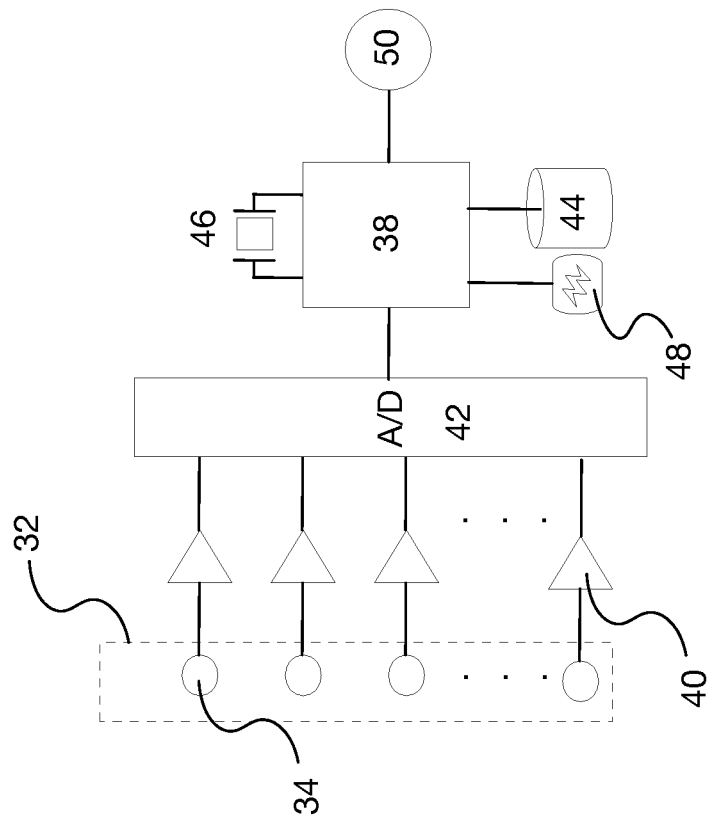
FIG. 6 illustrates an example of a sensor package arrangement for optional use with the head-mounted illumination device of the present invention.

The sensor pad(s) and associated electronics may allow for detection of electrical signals in the manner described by von Rosenberg, W. et al., "Smart Helmet: Monitoring Brain, Cardiac and Respiratory Activity," Conf. Proc. IEEE Eng. Med. Biol. Soc. 2015, pp. 1829-32 (2015). For example, as shown in FIG. 6, sensor pad(s) 34 may be attached by electrical leads to a processor 38, e.g., via associated amplifiers 40, analog-to-digital converters 42, etc., which samples the signals from the sensor pads periodically. A record of the sampled signals may be stored locally, e.g., in a suitable writable memory 44 such as a flash memory, and also may be transmitted to a remote monitoring location via a telemetry transmitter 48 and an associated antenna. Alternatively, the telemetry may be transmitted only when the transmitter is activated, e.g., by an on-scene paramedic, or by the wearer him/herself. Upon command, any stored samples may be similarly transmitted so that a history of the wearer's biometric and vital signs can be analyzed by a physician or other person at the remote monitoring station, or locally via an output port 50.

In some embodiments, the sensor package may also include one or more accelerometers 46 which provide inputs to processor 38 concerning rapid accelerations/decelerations of the wearer's head. Such measurements may be important when assessing possible traumatic brain injuries, cervical spinal injuries, and the like.

Although not shown in the various views, a power source for the electronics is provided and may be housed within the harness 10 or located external thereto (e.g., worn on a vest or pack). In some cases, a primary power source may be located external to the harness 10 and a secondary power source provided integral thereto. This would allow the primary power source to be decoupled from the harness, which would then revert to using the secondary power source (e.g., a small battery or the like), at least temporarily. This would allow for continuous monitoring of the biometric and vital signs and provision of related telemetry. Primary power may later be restored by an attending medic using a transportable power supply. To facilitate this operation, the harness may be provided with one or more ports allowing connection of different forms of power supplies.

Beyond comfort, the present head-worn illumination device offers beam separation/brightness consistency when closing distance/peering. For example, by having separate illumination sources on booms on either side of a wearer's face, with each being mounted on a pivotable, hinged panel, a wearer can aim each illumination source independently so as to provide for combining the illumination of the respective beams at a desired point in front of the wearer (e.g., corresponding to an area of interest to the wearer), so as to maximize the provided illumination at that point. Then, by moving his/her head towards/away from the area of interest, the user can provide a form of brightness control over that area of illumination. As the user moves his/her head, the beams provided by the illumination sources will separate, thereby adjusting the effective amount of illumination at the area of interest. In some embodiments, haptic feedback may be used for various indications, e.g., low battery, etc. Embodiments of the head-worn illumination device may also support other components of a head-worn "system" that includes integrated eyewear components, disposable masks and caps, heads-up display, sensors, data capture components, etc.

Illumination devices of the kind described herein, and especially the harness, booms, and hinged panels thereof, may be fashioned from a variety of materials, including but not limited to plastics (e.g., zylonite), metals and/or metal alloys, carbon fiber, wood, cellulose acetates (including but not limited to nylon), natural horn and/or bone, leather, epoxy resins, and combinations of the foregoing. Fabrication processes include, but are not limited to, injection molding, sintering, milling, and die cutting. Alternatively, or in addition, one or more additive manufacturing processes, such as extrusion, vat photopolymerization, powder bed fusion, material jetting, or direct energy jetting, may be used to fashion the illumination device and/or components thereof.

Thus, illumination devices and, more particularly, such illumination devices as are mounted on a frame intended to be worn on the person of a user, for example, on the user's head, have been described.

What is claimed is:

1. A wearable headgear system, comprising:
a harness shaped to be worn on a wearer's head;
a heads up display (HUD) screen pivotable on said harness to be positioned in the wearer's line of sight when in use and to be positioned out of the wearer's line of sight when not in use; and
a boom attached to the harness, extending below the wearer's eye when the wearable headgear system is worn on the wearer's head, and supporting a panel, said panel having attached thereto a light source and a camera, said light source oriented to project light in a direction of the wearer's view when the harness is worn on the wearer's head, wherein the panel is hingeably attached to the boom.

2. The wearable headgear system of claim 1, wherein the light source includes one or more light emitting diodes (LEDs).

3. The wearable headgear system of claim 2, wherein at least some of the LEDs emit light in non-visible wavelengths.

4. The wearable headgear system of claim 2, wherein the LEDs are operable by a hands-free activation switch.

5. The wearable headgear system of claim 1, further comprising HUD projection optics oriented to project information on the HUD screen.

6. The wearable headgear system of claim 1, further including an audio communication transmitter.

7. The wearable headgear system of claim 6, wherein the audio communication transmitter includes a bone conduction transducer for transmission of audio signals.

8. The wearable headgear system of claim 1, wherein the harness is articulated at one or more hinge points.

9. The wearable headgear system of claim 1, wherein the harness includes one or more grip points along its inner surface and said grip points are fitted with pads for contacting the wearer's skin.

10. The wearable headgear system of claim 1, wherein the boom is swively-mounted to the harness.

11. The wearable headgear system of claim 1, further comprising a sensor package for monitoring the wearer's vital statistics.

12. The wearable headgear system of claim 11, wherein the sensor package includes a sensor pad integrated in the harness.

13. The wearable headgear system of claim 1, wherein the light source is operable by hands-free activation.

* * * * *